(12) United States Patent
Moyer

(10) Patent No.: US 8,949,551 B2
(45) Date of Patent: Feb. 3, 2015

(54) MEMORY PROTECTION UNIT (MPU) HAVING A SHARED PORTION AND METHOD OF OPERATION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 209 days.

(21) Appl. No.: 13/249,829

(22) Filed: Sep. 30, 2011

(65) Prior Publication Data

US 2012/0215991 A1    Aug. 23, 2012

Related U.S. Application Data

(63) Continuation-in-part of application No. 13/033,327, filed on Feb. 23, 2011.

(51) Int. Cl.
*G06F 12/14* (2006.01)

(52) U.S. Cl.
CPC ............ *G06F 12/1441* (2013.01); *G06F 12/14* (2013.01); *G06F 12/1491* (2013.01)
USPC ....................................................... 711/152

(58) Field of Classification Search
CPC .................................. G06F 13/28; G06F 12/14
USPC .................................................. 711/152, 123
See application file for complete search history.

(56) References Cited

U.S. PATENT DOCUMENTS

| | | | |
|---|---|---|---|
| 4,325,120 A * | 4/1982 | Colley et al. | 711/202 |
| 4,672,538 A * | 6/1987 | Takane | 711/2 |
| 4,774,653 A | 9/1988 | James | |
| 4,949,238 A * | 8/1990 | Kamiya | 711/164 |
| 5,517,651 A * | 5/1996 | Huck et al. | 712/229 |
| 5,577,230 A | 11/1996 | Argade et al. | |
| 5,649,159 A | 7/1997 | Le et al. | |
| 5,666,509 A | 9/1997 | McCarthy et al. | |
| 5,822,786 A * | 10/1998 | Widigen et al. | 711/209 |
| 5,889,952 A | 3/1999 | Hunnicutt et al. | |
| 6,101,590 A | 8/2000 | Hansen | |
| 6,412,043 B1 | 6/2002 | Chopra et al. | |
| 6,449,699 B2 | 9/2002 | Franke et al. | |
| 6,449,700 B2 | 9/2002 | Hagersten et al. | |
| 6,591,340 B2 | 7/2003 | Chopra et al. | |
| 6,718,426 B2 | 4/2004 | Naya et al. | |

(Continued)

FOREIGN PATENT DOCUMENTS

WO    9849623 A1    11/1998

OTHER PUBLICATIONS

MCF5301x Reference Manual, Aug. 2009, Freescale Semiconductors, Inc, Rev. 4, Chapter 13.*

(Continued)

*Primary Examiner* — April Y Blair
*Assistant Examiner* — Kenneth Tsang

(57) ABSTRACT

In a disclosed embodiment, a data processing system comprises a memory protection unit (MPU); and a plurality of region descriptors associated with the MPU. Each region descriptor is associated with one of multiple subsets of the region descriptors and includes an address range, protection settings, and attributes for a respective region of memory. The subsets include data-only region descriptors, instruction-only region descriptors, and shared region descriptors. The shared region descriptors are used to access memory regions for data and instruction memory requests.

20 Claims, 8 Drawing Sheets

(56) References Cited

U.S. PATENT DOCUMENTS

| | | | |
|---|---|---|---|
| 6,810,471 | B2 | 10/2004 | Fujii |
| 6,836,836 | B2 | 12/2004 | Shinozaki |
| 6,898,697 | B1* | 5/2005 | Gao et al. ............ 712/229 |
| 7,353,535 | B2 | 4/2008 | Kaler et al. |
| 7,805,588 | B2 | 9/2010 | Bridges et al. |
| 2002/0065996 | A1* | 5/2002 | Garnett et al. ............ 711/156 |
| 2002/0078239 | A1 | 6/2002 | Howard et al. |
| 2002/0199076 | A1 | 12/2002 | Fujii |
| 2003/0135709 | A1* | 7/2003 | Niles et al. ............ 711/220 |
| 2003/0191846 | A1 | 10/2003 | Hunnicutt et al. |
| 2004/0049600 | A1 | 3/2004 | Boyd et al. |
| 2005/0060606 | A1* | 3/2005 | Kalan et al. ............ 714/12 |
| 2006/0149911 | A1 | 7/2006 | Kimelman et al. |
| 2007/0011419 | A1 | 1/2007 | Conti |
| 2007/0079093 | A1 | 4/2007 | Axford et al. |
| 2007/0277009 | A1* | 11/2007 | Anschel et al. ............ 711/159 |
| 2008/0163353 | A1 | 7/2008 | Conti |
| 2008/0250228 | A1 | 10/2008 | Elliott et al. |
| 2008/0306954 | A1 | 12/2008 | Hornqvist |
| 2009/0007219 | A1 | 1/2009 | Abzarian et al. |
| 2009/0138963 | A1 | 5/2009 | Sato et al. |
| 2009/0204777 | A1 | 8/2009 | Norman |
| 2010/0107243 | A1 | 4/2010 | Moyer et al. |

OTHER PUBLICATIONS

PowerPC e500 Core Family Reference Manual, Apr. 2005, Freescale Semiconductors, Inc, Rev. 1, Chapter 2.12.*

PowerPC Microprocessor Family: The Bus Interface for 32-Bit Microprocessors, Jan. 2004, Freescale Semiconductors, Inc, Rev. 1, Chapter 2.5.4.*

PowerPC e500 Core Family Reference Manual (E500CORERM Rev. 1, pub. Apr. 2005, Freescale Semiconductors, Inc. 1-37).*

MCF5301x Reference Manual (MCF53017RM Rev. 4, Pub. Aug. 2009, Freescale Semiconductors, Inc. Chapter 13).*

U.S. Appl. No. 13/182,734, filed Jul. 14, 2011.

U.S. Appl. No. 13/033,317, filed Feb. 23, 2011.

Non-Final Office Action mailed Jun. 21, 2013 for U.S. Appl. No. 13/033,327, 27 pages.

Non-Final Office Action mailed Apr. 5, 2013 for U.S. Appl. No. 13/182,734, 17 pages.

Non-Final Office Action mailed Dec. 20, 2012, for U.S. Appl. No. 13/033,317, 17 pages.

Final Office Action mailed Jan. 16, 2014 for U.S. Appl. No. 13/033,327, 20 pgs.

Final Office Action mailed Jul. 18, 2013 for U.S. Appl. No. 13/033,317, 13 pages.

Notice of Allowance mailed Jul. 16, 2013 for U.S. Appl. No. 13/182,734, 12 pages.

Non-Final Office Action mailed Feb. 13, 2014 for U.S. Appl. No. 13/033,317, 21 pages.

Non-Final Office Action mailed Jun. 16, 2014 for U.S. Appl. No. 13/033,327; 23 pages.

Final Office Action mailed Sep. 9, 2014 in U.S. Appl. No. 13/033,317, 21 pages.

\* cited by examiner

| 301 | 302 | 303 | 304 | 305 | 306 | 307 | 308 | 309 | 310 |
|---|---|---|---|---|---|---|---|---|---|
| V | UPPER BOUND ADDRESS | LOWER BOUND ADDRESS | INST | SX/SR | SW | UX/UR | UW | CI | G |

| FIELD | COMMENTS |
|---|---|
| V | VALID BIT FOR ENTRY |
| UPPER_BOUND | UPPER ADDRESS BOUND (COMPARED AGAINST EFFECTIVE ADDRESS) |
| LOWER_BOUND | LOWER ADDRESS BOUND (COMPARED AGAINST EFFECTIVE ADDRESS) |
| INST | INSTRUCTION OR DATA ACCESS ENTRY (1=INST) |
| SW/SR | SUPERVISOR EXECUTE (INST=1) OR READ (INST=0) PERMISSION BITS |
| SW | SUPERVISOR WRITE PERMISSION BIT |
| UX/UR | USER EXECUTE (INST=1) OR READ (INST=0) PERMISSION BITS |
| UW | USER WRITE PERMISSION BIT |
| CI | CACHE-INHIBITED REGION ATTRIBUTE |
| G | GUARDED REGION ATTRIBUTE (NOT PRESENT IN DEDICATED INST ENTRIES) |

FIG. 4

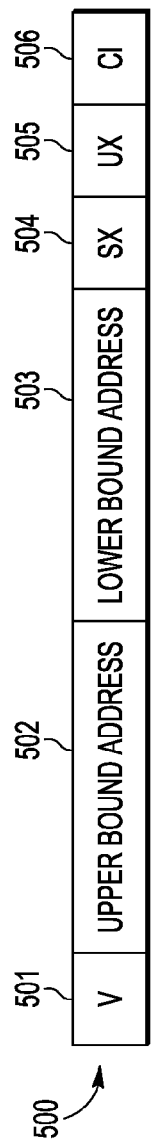
FIG. 5
| FIELD | COMMENTS |
|---|---|
| V | VALID BIT FOR ENTRY |
| UPPER_BOUND | UPPER ADDRESS BOUND (COMPARED AGAINST EFFECTIVE ADDRESS) |
| LOWER_BOUND | LOWER ADDRESS BOUND (COMPARED AGAINST EFFECTIVE ADDRESS) |
| SX | SUPERVISOR EXECUTE PERMISSION BIT |
| UX | USER EXECUTE PERMISSION BIT |
| CI | CACHE-INHIBITED REGION ATTRIBUTE |
FIG. 6
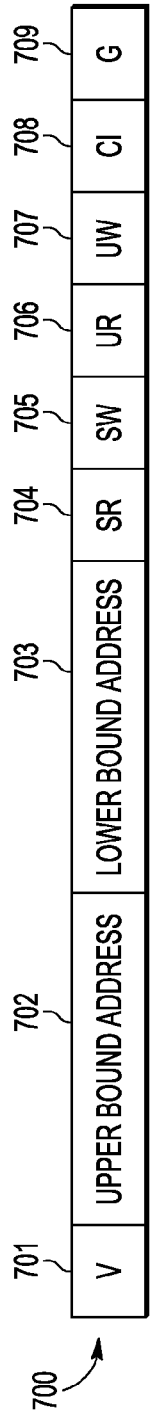
FIG. 7

| FIELD | COMMENTS |
|---|---|
| V | VALID BIT FOR ENTRY |
| UPPER_BOUND | UPPER ADDRESS BOUND (COMPARED AGAINST EFFECTIVE ADDRESS) |
| LOWER_BOUND | LOWER ADDRESS BOUND (COMPARED AGAINST EFFECTIVE ADDRESS) |
| SR | SUPERVISOR READ PERMISSION BIT |
| SW | SUPERVISOR WRITE PERMISSION BIT |
| UR | USER READ PERMISSION BIT |
| UW | USER WRITE PERMISSION BIT |
| CI | CACHE-INHIBITED REGION ATTRIBUTE |
| G | GUARDED REGION ATTRIBUTE (NOT PRESENT IN DEDICATED INST ENTRIES) |

FIG. 8

| ARCH VERSION | OTHER CAPABILITIES INFORMATION | # OF INST. ENTRIES | # OF DATA ENTRIES | # OF SHARED ENTRIES |
|---|---|---|---|---|

| NAME | COMMENTS, OR FUNCTION WHEN SET |
|---|---|
| VALID | MPU ENTRY VALID<br>0 - THIS MPU ENTRY IS INVALID<br>1 - THIS MPU ENTRY IS VALID |
| INST | INSTRUCTION ENTRY<br>0 - THIS MPU ENTRY IS USED FOR MATCHING DATA ACCESSES ONLY<br>1 - THIS MPU ENTRY IS USED FOR MATCHING INSTRUCTION ACCESSES ONLY<br>WHEN SHD=0, THIS BIT IS USED TO SELECT THE INST ENTRY PORTION OF THE MPU FOR MPURE AND MPUWE INSTRUCTION OPERATIONS.<br>WHEN SHD=1, THIS BIT IS USED TO INDICATE WHETHER THE ENTRY IN THE SHARED PORTION OF THE REGION DESCRIPTOR TABLE IS ASSIGNED AS AN ENTRY FOR EITHER INSTRUCTION ACCESS OR DATA ACCESS MATCHING. ONLY ONE OF THESE ACCESS TYPES IS MONITORED FOR MATCHING BY A GIVEN SHARED REGION DESCRIPTOR ENTRY. |
| SHD | SHARED ENTRY SELECT<br>0 - THE SHARED PORTION OF THE MPU IS NOT ACCESSED ON A MPURE OR MPUWE OPERATION. EITHER THE INSTRUCTION PORTION OR THE DATA PORTION IS ACCESSED BASED ON THE SETTING OF INST. THE ENTRY WITHIN THE SELECTED PORTION IS BASED ON ESEL.<br>1 - THE SHARED PORTION OF THE MPU IS ACCESSED ON A MPURE OR MPUWE OPERATION. THE INSTRUCTION AND DATA PORTIONS ARE NOT ACCESSED. THE INST BIT IS USED TO INDICATE WHETHER THE ENTRY IN THE SHARED PORTION OF THE MPU IS ASSIGNED AS AN ENTRY FOR INSTRUCTION ACCESS OR DATA ACCESS MATCHING. ONLY ONE OF THESE ACCESS TYPES IS MONITORED FOR MATCHING BY A GIVEN SHARED REGION DESCRIPTOR ENTRY. ESEL DEFINES WHICH SHARED ENTRY IS SELECTED.<br>THIS BIT IS USED TO CONTROL SELECTION OF THE SHARED PORTION OF THE REGION DESCRIPTOR TABLE. |
| ESEL | ENTRY SELECT FOR MPU.<br>THIS FIELD IS USED TO SELECT AN ENTRY FOR READING OR WRITING IN CONJUNCTION WITH THE SETTINGS OF SHD AND INST. |

FIG. 11

| NAME | COMMENTS, OR FUNCTION WHEN SET |
|---|---|
| UW | USER MODE WRITE PERMISSION<br>0 - NO USER MODE WRITE PERMISSION<br>1 - USER MODE HAS WRITE PERMISSION<br>DETERMINES USER MODE WRITE (W) PERMISSION WHEN INST=0. IGNORED WHEN INST=1. |
| SW | SUPERVISOR MODE WRITE PERMISSION<br>0 - NO SUPERVISOR MODE WRITE PERMISSION<br>1 - SUPERVISOR MODE HAS WRITE PERMISSION<br>DETERMINES SUPERVISOR MODE WRITE (W) PERMISSION WHEN INST=0. IGNORED WHEN INST=1. |
| UX/UR | USER MODE EXECUTE/READ PERMISSION<br>0 - NO USER MODE EXECUTE/READ PERMISSION<br>1 - USER MODE HAS EXECUTE/READ PERMISSION<br>DETERMINES USER MODE EXECUTE (X) PERMISSION WHEN INST=1, OR USER MODE READ (R) PERMISSION WHEN INST=0. |
| SX/SR | SUPERVISOR MODE EXECUTE/READ PERMISSION<br>0 - NO SUPERVISOR MODE EXECUTE/READ PERMISSION<br>1 - SUPERVISOR MODE HAS EXECUTE/READ PERMISSION<br>DETERMINES SUPERVISOR MODE EXECUTE (X) PERMISSION WHEN INST=1, OR SUPERVISOR MODE READ (R) PERMISSION WHEN INST=0. |
| CI | CACHE INHIBITED<br>0 - THIS REGION IS CONSIDERED CACHEABLE<br>1 - THIS REGION IS CONSIDERED CACHE-INHIBITED |
| G | GUARDED<br>0 - ACCESSES TO THIS REGION ARE NOT GUARDED, AND CAN BE PERFORMED BEFORE IT IS KNOWN IF THEY ARE REQUIRED BY THE SEQUENTIAL EXECUTION MODEL<br>1 - ALL LOADS AND STORES TO THIS REGION ARE PERFORMED WITHOUT SPECULATION (i.e. THEY ARE KNOWN TO BE REQUIRED)<br>THIS BIT IS NOT IMPLEMENTED IN DEDICATED INSTRUCTION ENTRIES, AND IS IGNORE IN SHARED ENTRIES WITH INST=1. |

FIG. 12

MEMORY PROTECTION UNIT (MPU) HAVING A SHARED PORTION AND METHOD OF OPERATION

FIELD

This disclosure relates generally to data processing systems, and more specifically, to a memory protection unit having a shared portion.

RELATED ART

Some embedded processors implement an internal Memory Protection Unit (MPU) to provide protection information for a number of variable size memory regions. Access protections are enforced on instruction fetches and data read and write accesses by comparing these access addresses with each entry in the MPU to determine a match. A descriptor match for an access occurs when the access address lies within the address range defined by the region descriptor and the permissions associated with the region descriptor allow the access type. Matching descriptors provide stored protection attributes which selectively allow or deny the access and may also contain memory attributes to be applied to the access.

Many current central processing units (CPUs) are structured as a Harvard design, with separate and concurrently active instruction fetch and data read/write ports. Therefore, an MPU may be designed to accommodate the independent instruction fetch and data read/write ports of the CPU. However, due to cost issues, the total number of region descriptors is limited. Therefore, a need exists for an MPU which can effectively accommodate differing system needs in terms of mapping instruction space and data space within the MPU.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates, in diagrammatic form, a region descriptor of a shared section in the MPU of FIG. 2, in accordance with one embodiment of the present invention.

FIG. 4 illustrates, in table form, descriptions for various fields in the region descriptor of FIG. 3, in accordance with one embodiment of the present invention.

FIG. 5 illustrates, in diagrammatic form, a region descriptor of an instruction section in the MPU of FIG. 2, in accordance with one embodiment of the present invention.

FIG. 6 illustrates, in table form, descriptions for various fields in the region descriptor of FIG. 5, in accordance with one embodiment of the present invention.

FIG. 7 illustrates, in diagrammatic form, a region descriptor of a data section in the MPU of FIG. 2, in accordance with one embodiment of the present invention.

FIG. 8 illustrates, in table form, descriptions for various fields in the region descriptor of FIG. 7, in accordance with one embodiment of the present invention.

FIG. 9 illustrates, in diagrammatic form, an MPU configuration register useable in the MPU of FIG. 2, in accordance with one embodiment of the present invention.

FIGS. 11-12 illustrate, in table form, descriptions of various fields in the registers of FIG. 10, in accordance with one embodiment of the present invention.

DETAILED DESCRIPTION

Figure 1:
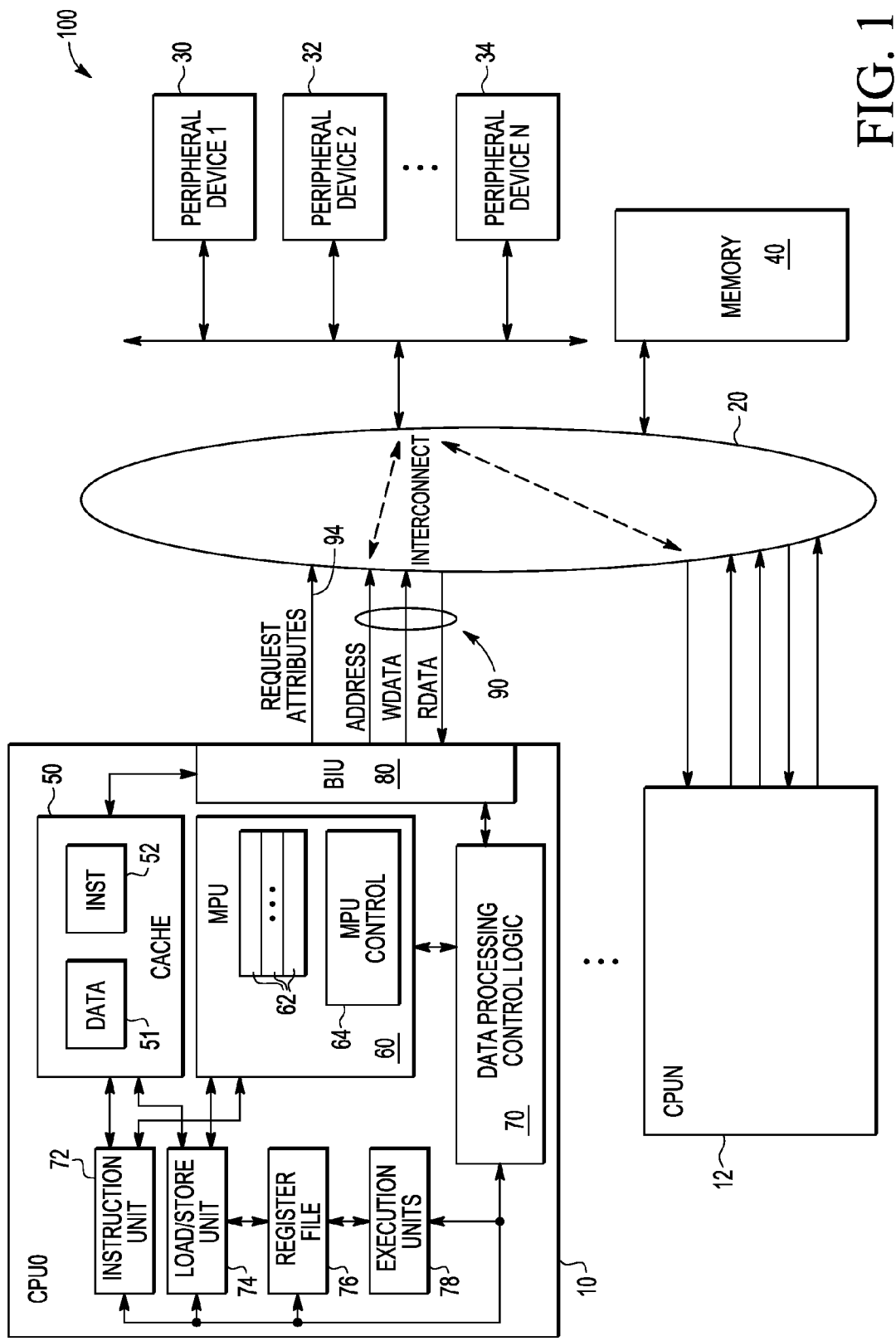
FIG. 1 illustrates, in block diagram form, a data processing system in accordance with one embodiment of the present invention.

Due to cost issues, the total number of region descriptors available within a memory protection unit (MPU) is limited. However, different systems having differing needs in terms of the mapping of instruction space and data space within the MPU. That is, some systems may require more instruction space while others may require more data space. Furthermore, a system's needs may change depending upon the application. In one embodiment, in order to accommodate differing needs in terms of mapping instruction space and data space, a partitioned MPU with multiple subsets of region descriptors is provided. In one embodiment, the partitioned MPU includes 3 separate subsets: a first subset which supports only instruction access requests, a second subset which supports only data access requests; and a third subset which supports either an instruction or data access request. Each region descriptor in the third subset is independently configurable to support either an instruction access or a data access. This partitioning allows for increased flexibility. Typically, unused entries in a dedicated data MPU cannot be used for instruction accesses and unused entries in a dedicated instruction MPU cannot be used for data accesses. Therefore, in the case of dedicated data or instruction MPUs, each dedicated MPU must be sized for the maximal expected needs for the corresponding type of access. However, this results in increased cost. Therefore, in one embodiment of the present disclosure, the shared subset of the partitioned MPU can be utilized for either data or instruction accesses. Furthermore, the size of individual entries themselves in the first and second subsets can be minimized to cover only instruction or data protections/attributes, respectively. This may allow for further cost reduction.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

FIG. 1 is a block diagram illustrating a data processing system 100 in accordance with an embodiment of the present disclosure. Data processing system 100 includes a first processor 10 identified as CPU 0, a second processor core 12 identified as CPU N, an interconnect 20, a memory device 40, and peripheral devices 30, 32, 34. Processor 10 includes a cache 50, which further includes a data cache 51 and an instruction cache 52; an MPU 60, which further includes region descriptors 62 and an MPU control module 64; data processing control logic 70; execution units 78; a register file 76, a load/store unit 74, an instruction unit 72; and a bus interface unit (BIU) 80. Processor 12 includes similar subcomponents (not shown), and each processor can include additional modules (not shown for clarity).

Memory access protection policies can be implemented by one or more memory protection units (MPUs) 60 included in data processing system 100. During operation of data processing system 100, data processing logic module 70 at a processor 10, 12 may issue a request to access a location in memory 40. For example, data processing logic module 70 may issue a request to retrieve a program instruction or data information from memory 40, or to store data information to memory 40. Memory access protection policies determine whether to allow or deny the requested access. If two region descriptors within a memory protection unit have overlapping address ranges in an area in memory and have conflicting access policies, a default access policy may be implemented.

In the illustrated embodiment of FIG. 1, data processing system 100 is a general purpose data processing device that can be incorporated into any of a number of electronic systems, including portable electronic devices, computer devices, automotive devices, communications devices, and the like. Processors 10, 12 include circuitry configured to execute software and thereby perform a desired task.

A memory access request may be associated with execution of a load instruction to retrieve information from a particular location in memory 40, or execution of a store instruction to write information to a particular location in memory 40. An address accompanies the memory access request to identify a location within a memory to be accessed. A load or store instruction can be included in a software program, and the software program can be executed in a supervisor mode or in a user mode. The execution of a software program can be referred to as a process, and a read or write access request can be associated with a current process identifier value (PID) assigned to the particular process being executed.

Information accessed during a memory read operation can include instructions or can include data information, while information associated with a memory write operation is generally data information. Accordingly, memory access requests can be characterized based on values of one or more request attributes. Examples of request attributes include an address attribute for indicating an address of a location to be accessed; a read attribute for indicating whether or not a request is a read request; a write attribute for indicating a whether or not a request is a write request; a supervisor attribute for indicating whether or not a request is issued in supervisor mode; a user attribute for indicating whether or not a request is issued in user mode, a process identification (PID) attribute for identifying a process associated with a request; an instruction attribute for indicating whether or not the requested information is an instruction; and the like. Any number of request attributes can be associated with a memory access request.

As used herein, a memory location is intended to refer to any data storage location having a unique system address. Such locations, including memory devices 40, peripheral devices 30, 32, 34, and the like, are included within a system address space. Similarly, the phrase memory access request is used herein to refer to any request to access a storage location based on a unique system address. For simplicity, memory-mapped storage locations and corresponding access requests described herein are referred to as memories and memory access requests, respectively.

Processors 10, 12 can communicate with memory 40 and peripherals 30-34 via interconnect 20. In particular, interconnect 20 may conduct signals to communicate REQUEST INFORMATION 90 and REQUEST ATTRIBUTES 94. The REQUEST INFORMATION 90 includes a memory address (ADDRESS), write data (WDATA), and read data (RDATA). Memory device 40 can provide storage locations accessible via memory access requests issued by processor 10 or processor 12. Memory device 40 can include any of a variety of memory types, including dynamic random access memory (DRAM), static random access memory (SRAM), and the like. For clarity, FIG. 1 omits other components of data processing system 100 whose operation is well known to those of ordinary skill in the art, such as high-level cache memory devices, external interfaces, and the like. Furthermore, data processing system 100 can include a greater or a fewer number of processors.

During operation, processors 10 and 12 can access memory 40 to obtain instructions, to retrieve data information, or to store data information. For example, operation of instruction unit 72, load/store unit 74, and execution units 78 may operate under control of data processing control logic 70 to retrieve and execute instructions. For example, load/store unit 74 and execution units 78 may be used in executing instructions fetched by instruction unit 72, in which load/store unit 74 and execution units 78 may access register file 76 as needed. Register file 76 may include both special purpose registers and general purpose registers which are also accessible by control logic 70. Therefore, instruction unit 72 may be used to issue memory access requests to retrieve instruction information at particular memory addresses of memory 40, and load/store unit 74 may be used to issue memory access request to retrieve data information from a particular memory address of memory 40 or to provide data information for storage at a particular memory address of memory 40. Instruction unit 72 communicates with instruction cache 52 to determine if a memory access request issued by instruction unit 72 hits or misses in instruction cache 52. Load/store unit 74 also communicates with data cache 51 to determine if a memory access request issued by load/store unit 74 hits or misses in data cache 51. Before transmitting memory access requests external to processor 10, MPU 60 can determine if the requesting device (or the software process from which the request originates) possesses suitable permissions to allow the access. Therefore, for memory access requests issued by instruction unit 72, if MPU 60 determines that the request is allowed, and the desired instruction information is not present in instruction cache 52 (a cache miss), the memory access request is provided to BIU 80. Similarly, for memory access requests issued by load/store unit 74, if MPU 60 determines that the request is allowed, and the request misses in data cache 51, the memory access request is provided to BIU 80. BIU 80 is configured to forward the memory access request over interconnect 20 to memory 40 or peripherals 30, 32, 34.

BIU 80 can initiate a memory read access request by transmitting a memory address via signal ADDRESS, a read command signal (not shown), and REQUEST ATTRIBUTES 94 identifying values of other attributes associated with the request. These signals are propagated via interconnect 20 to memory 40. Memory device 40 can return the requested data information to BIU 80 and then data processing logic module 70 via the signal RDATA over interconnect 20. BIU 80 can initiate a memory write access request by transmitting a memory address via signal ADDRESS, the data information to be stored at memory 40 via the signal WDATA, a write command signal (not shown), and REQUEST ATTRIBUTES 94 identifying attributes associated with the request.

A memory access request to read or to write to memory 40 can include additional information that can be communicated to memory 40 via the signal REQUEST ATTRIBUTES 94 to indicate various request attributes associated with the access request. REQUEST ATTRIBUTES 94 can include information identifying the source of the request and the type of the request, as described above. For example, REQUEST ATTRIBUTES 94 can include an indication that the request is associated with a process running in supervisor mode or user mode, an indication that the request is to perform a read operation or a write operation, and the like. REQUEST ATTRIBUTES 94 can include other information that can further characterize an associated memory access request in a particular way.

As described above, an MPU, such as MPU 60 can maintain respective permission information (i.e. protection settings) and access attributes associated with one or more address regions. MPU 60 enforces protections on instruction fetches and data read and write accesses by comparing a memory address associated with the memory access request with each entry in MPU 60 (stored within a region descriptor 62) which corresponds to the appropriate access type (instruction vs. data) to determine a match. If MPU 60 identifies a matching region descriptor 62 corresponding to the memory address, permissions included in that region descriptor 62 can be evaluated. Permissions can relate to any number of protection attributes that together define aspects of a protection policy. For example, a region descriptor can designate that locations included within a particular memory address region are write protected, in which case a request to store information, e.g., a request with an attribute that indicates information is to be stored, at a location within the region is denied while a request to retrieve information, e.g., a request with an attribute that indicates information is to be read, from a location within the region may be allowed. Similarly, a region descriptor 62 can designate that locations included within a memory address region are accessible only to access requests associated with an attribute that indicates the access request was issued by a process running in supervisor mode.

Figure 2:
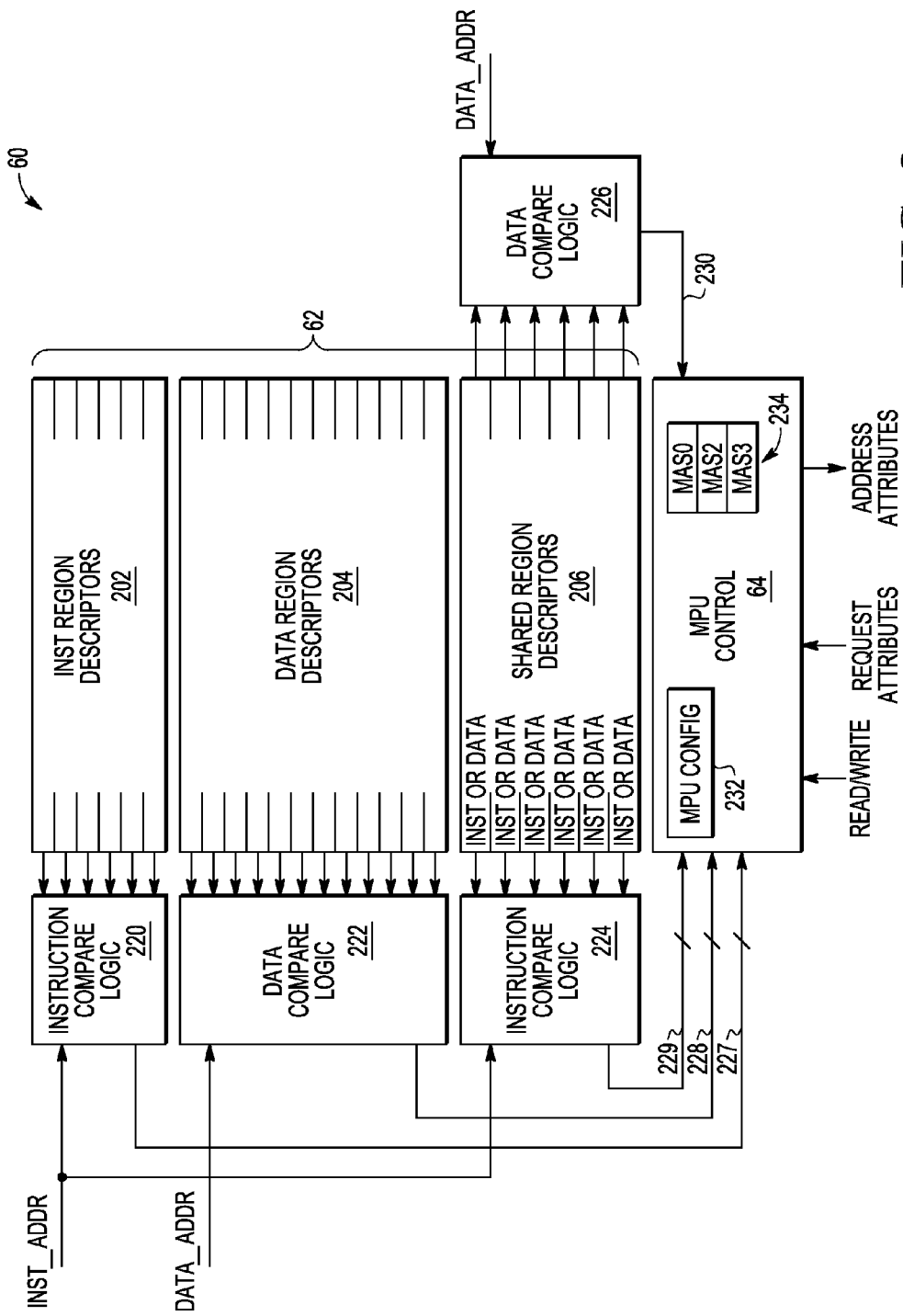
FIG. 2 illustrates, in block diagram form, a memory protection unit (MPU) in the data processing system of FIG. 1, in accordance with one embodiment of the present invention.

The operation of MPU 60 may be better understood with reference to FIG. 2. FIG. 2 is a block diagram illustrating MPU 60 in accordance with a specific embodiment of the present disclosure. MPU 60 includes a set of instruction region descriptors 202, a set of data region descriptors 204, and a set of shared (instruction or data) region descriptors 206. Note that each of sets 202, 204, and 206 may be referred to as a subset of MPU 60. Each entry in subset 202 corresponds only to instruction accesses and may be referred to as an instruction-only region descriptor, and each entry in subset 204 corresponds only to data accesses and may be referred to as a data-only region descriptor. However, each entry in subset 206 can be configured to correspond to either an instruction access (and thus be an instruction region descriptor) or a data access (and thus be a data region descriptor). MPU 60 also includes an MPU control module 64. MPU 60 includes an MPU configuration register 232 and MPU assist registers 234, which, in the illustrated embodiment, includes a MAS0 register, a MAS2 register, and a MAS3 register. MPU 60 also includes instruction compare logic 220 coupled to the set of instruction region descriptors 202 and coupled to receive an instruction address (INST_ADDR), data compare logic 222 coupled to the set of data region descriptors 204 and coupled to receive a data address (DATA_ADDR), instruction compare logic 224 coupled to the set of shared region descriptors 206 and coupled to receive INST_ADDR, and data compare logic 226 coupled to the set of shared region descriptors 206 and coupled to receive DATA_ADDR. INST_ADDR refers to an access address corresponding to a memory access request which corresponds to a memory location which is capable of storing instruction information (and not data information). DATA_ADDR refers to an access address corresponding to a memory access request which corresponds to a memory location which is capable of storing data information (and not instruction information).

Instruction compare logic 220 uses the received INST_ADDR as well as the request attributes received by MPU 64 to perform a comparison with each entry in subset 202 and, in response thereto, provides a set of match indicators 227 to MPU 64 which indicate which entry, if any, resulted in a match. Similarly, data compare logic uses the received DATA_ADDR as well as the read/write indicator and request attributes received by MPU 64, to perform a comparison with each entry in subset 204 and, in response thereto, provides a set of match indicators 228 to MPU 64 which indicate which entry, if any, resulted in a match. Instruction compare logic 224 uses the received INST_ADDR as well as the request attributes received by MPU 64, to perform a comparison with each entry in subset 206 configured as an instruction descriptor and, in response thereto, provides a set of match indicators 229 to MPU 64 which indicate which entry, if any, resulted in a match. Data compare logic uses the received DATA_ADDR as well as the read/write indicator and request attributes received by MPU 64, to perform a comparison with each entry in subset 206 configured as a data region descriptor and, in response thereto, provides a set of match indicators 230 to MPU 64 which indicate which entry, if any, resulted in a match. Note that each match indicator in match indicators 227-230 may also include corresponding access attributes. If multiple matches are indicated for a particular INST_ADDR or DATA_ADDR, MPU control 64 may select which region descriptor is to be used. For example, a most restrictive or least restrictive access attribute of each matching entry can be selected by MPU 64 to apply.

MPU control module 64 operates to selectively allow or deny each requested memory access based on an address and privilege attributes associated with the request, based on whether the access is an instruction fetch access, a read access, or a write access, and based on the contents of one or more region descriptors included in the appropriate set of region descriptors 202, 204, or 206. As discussed above, each region descriptor in subset 202 supports only instruction accesses and are thus dedicated instruction region descriptors, and each region descriptor in subset 204 supports only data accesses and are thus dedicated data region descriptors. That is, instruction compare logic 220 is only enabled to perform comparisons of a received INSTR_ADDR with each entry in subset 202. Data compare logic 222 is only enabled to perform comparisons of a received DATA_ADDR with each entry in subset 204. That is, instruction compare logic 220 is not enabled when a data address is received and data compare logic 222 is not enabled when an instruction address is received. With respect to shared subset 206, instruction compare logic 224 is only enabled to perform comparisons of a received INSTR_ADDR for those entries configured as an instruction region descriptor and is disabled from performing any comparisons of the received INSTR_ADDR for those entries configured as a data region descriptor. Similarly, data compare logic 226 is only enabled to perform comparisons of a received DATA_ADDR for those entries configured as a data region descriptor and is disabled from performing any comparisons of the received DATA_ADDR for those entries configured as an instruction region descriptor. Therefore, note that although for shared subset 206, two sets of comparison logic is present for each entry (one for instruction address comparisons and one for data address comparisons), only one set needs to be enabled for any given access request since each is configured to either be an instruction region descriptor or data region descriptor.

As previously described, the request attributes received by MPU 64 can include an indication of whether the device or software process initiating the access request has supervisor privileges or instead has only user privileges, and may include other attributes, such as a bus master identification number and the like. If a memory access request is denied, MPU control module 64 can return a termination error response to the requesting device indicating that a memory access exception has occurred.

FIG. 3 illustrates, in diagrammatic form, an example of a region descriptor 300, which may correspond to any region descriptor in shared subset 206. Region descriptor 300 (which may also be referred to as an entry or a region descriptor entry) includes a plurality of fields 301-310. FIG. 4 provides, in table form, a description for each of the fields in region descriptor 300. Field 301 relates to a validity attribute, V. A region descriptor is invalid if a corresponding valid bit is not asserted. If the valid bit is asserted, and the address range associated with the region descriptor includes the address associated with a request, then access permission information included in the region descriptor can be considered in response to a memory access request.

Fields 302, UPPER BOUND, and 303, LOWER BOUND, relate to an upper-bound address attribute and a lower-bound address attribute, respectively, for indicating a relevant address range of the region descriptor.

Field 304 relates to an instruction attribute, INST, which can be asserted to identify that the region descriptor is only valid for instruction accesses, e.g., access requests wherein a corresponding instruction request attribute is also asserted. Accordingly, a corresponding instruction attribute is asserted in region descriptors included in set 202 (instruction region descriptors), and negated in region descriptors included in set 204 (data region descriptors). Alternatively, the instruction attribute INST may not be present at all in region descriptors in sets 202 and 204.

Fields 305 and 306 relate to a plurality of permission indicators (i.e. protection settings) including a SX indicator (supervisor execute), a SW indicator (supervisor write), and a SR indicator (supervisor read). In one embodiment, three fields may be used, one for each of SX, SR, and SW, which can be individually asserted to identify the types of supervisor level access requests that are allowed by the region descriptor to locations included within the address region specified by the region descriptor. For example, if the SW indicator is asserted, an access request identified as both a supervisor access and a write access (by assertion of corresponding request attributes accompanying the request received by MPU control 54) is permitted by the descriptor to store information to locations within the associated memory address region. Similarly, if the SR indicator is asserted, an access request identified as both a supervisor access and a read access is permitted by the descriptor to read locations with the associated region. Indicator SX identifies whether locations within the associated region can be executed. In the illustrated embodiment, field 306 relates to SW and field 305 relates to either SX or SR (indicated as SX/SR). If the instruction attribute, INST, is asserted (e.g. a logic level one), then field 305 relates to SX. However, if the instruction attribute, INST, is not asserted (e.g. a logic level zero), then field 305 relates to SR. In this manner, the size of region descriptor 300 is smaller as compared to using three separate fields for SW, SR, and SX.

Fields 307 and 308 relate to a plurality of permission indicators (i.e. protection settings) including a UX indicator (user execute), a UW indicator (user write), and a UR indicator (user read). In one embodiment, three fields may be used, one for each of UX, UR, and UW, which can be in individually asserted to identify the types of user level access requests that are permitted by the descriptor to locations corresponding to the region descriptor. In the illustrated embodiment, field 308 relates to UW and field 307 relates to either UX or UR (indicated as UX/UR). If the instruction attribute, INST, is asserted (e.g. a logic level one), then field 307 relates to UX. However, if the instruction attribute, INST, is not asserted (e.g. a logic level zero), then field 307 relates to UR. In this manner, the size of region descriptor 300 is smaller as compared to using three separate fields for UW, UR, and UX.

Field 309 relates to a cache-inhibit region attribute, CI. The cache-inhibit region attribute can be asserted to instruct a requesting device to not store information retrieved from locations within the associated region in a cache device, such as data cache 51 and instruction cache 52 of FIG. 1.

Field 310 relates to a guarded region attribute, G. The guarded region attribute can be asserted to indicate that locations included within the associated region operate differently than a normal memory element or register. For example, a memory mapped location whose value can change following or in response to an access, such as a FIFO, a volatile storage element, and the like. Accordingly, information associated with a guarded location typically is not stored in a cache memory device.

FIG. 5 illustrates, in diagrammatic form, an example of a region descriptor 500, which may correspond to any region descriptor in instruction subset 202. Region descriptor 500 (which may also be referred to as an entry or a region descriptor entry) includes a plurality of fields 501-506. FIG. 5 provides, in table form, a description for each of the fields in region descriptor 500. Field 501 relates to a validity attribute, V. A region descriptor is invalid if a corresponding valid bit is not asserted. If the valid bit is asserted, and the address range associated with the region descriptor includes the address associated with a request, then access permission information included in the region descriptor can be considered in response to a memory access request.

Fields 502, UPPER BOUND, and 503, LOWER BOUND, relate to an upper-bound address attribute and a lower-bound address attribute, respectively, for indicating a relevant address range of the region descriptor.

Field 504 relates to permission indicator SX. For example, if the SX indicator is asserted, an instruction access request identified as a supervisor access (by assertion of corresponding request attributes accompanying the request received by MPU control 54) is permitted by the descriptor to access memory locations within the associated memory address region. Field 505 relates to permission indicator UX.

Field 506 relates to a cache-inhibit region attribute, CI. The cache-inhibit region attribute can be asserted to instruct a requesting device to not store information retrieved from locations within the associated region in a cache device, such as instruction cache 52 of FIG. 1.

FIG. 7 illustrates, in diagrammatic form, an example of a region descriptor 700, which may correspond to any region descriptor in data subset 204. Region descriptor 700 (which may also be referred to as an entry or a region descriptor entry) includes a plurality of fields 701-708. FIG. 8 provides, in table form, a description for each of the fields in region descriptor 700. Field 701 relates to a validity attribute, V. A region descriptor is invalid if a corresponding valid bit is not asserted. If the valid bit is asserted, the address range associated with the region descriptor includes the address associated with a request, then access permission information included in the region descriptor can be considered in response to a memory access request.

Fields 702, UPPER BOUND, and 703, LOWER BOUND, relate to an upper-bound address attribute and a lower-bound address attribute, respectively, for indicating a relevant address range of the region descriptor.

Fields 704 and 705 relate to a plurality of permission indicators (i.e. protection settings) including a SR indicator (supervisor read), and a SW indicator (supervisor write), which can be individually asserted to identify the types of supervisor level access requests that are allowed by the region descriptor to locations included within the address region specified by the region descriptor. For example, if the SW indicator is asserted, an access request identified as both a supervisor access and a write access (by assertion of corresponding request attributes accompanying the request received by MPU control 54) is permitted by the descriptor to store information to locations within the associated memory address region. Similarly, if the SR indicator is asserted, an access request identified as both a supervisor access and a read access is permitted by the descriptor to read locations with the associated region.

Fields 706 and 707 relate to a plurality of permission indicators (i.e. protection settings) including a UR indicator (supervisor read), and a UW indicator (supervisor write), which can be individually asserted to identify the types of user level access requests that are allowed by the region descriptor to locations included within the address region specified by the region descriptor.

Field 708 relates to a cache-inhibit region attribute, CI. The cache-inhibit region attribute can be asserted to instruct a requesting device to not store information retrieved from locations within the associated region in a cache device, such as data cache 51 of FIG. 1.

Field 709 relates to a guarded region attribute, G. The guarded region attribute can be asserted to indicate that locations included within the associated region operate differently than a normal memory element or register. For example, a memory mapped location whose value can change following or in response to an access, such as a FIFO, a volatile storage element, and the like. Accordingly, information associated with a guarded location typically is not stored in a cache memory device.

Note that in the illustrated embodiments of FIGS. 5 and 7, an INST field is not included in the region descriptor since the region descriptors 500 and 700 are located in subsets 202 and 204 of MPU 60 which are subsets dedicated to an instruction access and data access, respectively. Therefore, in these region descriptors, it is not necessary to include the INST field. However, in alternate embodiments, it may be present region descriptor 500, 700, or both. Note also that, in the illustrated embodiments, the SX and UX permission indicators are only present in region descriptors 300 and 500, but not in region descriptor 700. In any of region descriptors 300, 500, and 700, additional fields may be present, such as other request attributes which may be used to identify or further qualify an access request in a desired way. Furthermore, the additional fields may include additional access attributes, in addition to or in place of, the CI and G attributes which may define or further define how the access is to be performed.

During operation of MPU 60, a memory access request generated by either instruction unit 72 or load/store unit 74 can be evaluated to determine an address of a location to be accessed, whether the requested processor or process access request has supervisor or user privileges, whether the request is a read access or a write access, and whether the request is for an instruction access or a data access. This information is provided to MPU control 64 of MPU 60 to determine if a match occurs within any of the region descriptors. MPU 60 can examine each valid region descriptor of the appropriate sector or sectors (e.g. instruction region descriptors 202 and shared region descriptors 206 for instruction access requests, and data region descriptors 204 and shared region descriptors 206 for data access requests). If MPU 60 identifies a region descriptor that matches the incoming access request, MPU 60 either allows or denies the access based on the request attributes and based on permissions specified by the matching region descriptor. For example, if a user-mode request to write to address XYZ is received, and a valid region descriptor defines an address region that includes address XYZ, the requested access can be allowed if the UW attribute is asserted, and denied if the UW attribute is not asserted. Furthermore, if the memory access is allowed, the memory access can be performed as a cache-inhibited access or a guarded access based on the values of the CI and G fields in the matching region descriptor, respectively. If more than one valid region descriptor matches the requested access address, any policy may be utilized by MPU control 64 to determine which region descriptor or portions of the region descriptor govern the access. For example, the least restrictive access attributes of the multiple matching region descriptors may be used.

During operation of processor 10, it may be desirable to update region descriptors contained within MPU 60, or to read information from the region descriptors. Therefore, in one embodiment, MPU control 64 includes MPU assist (MAS) registers 234 (such as MAS0, MAS2, and MAS3) which may be used to allow MPU control 64 to perform read and write operations on a selected region descriptors of MPU 60. In one embodiment, MAS registers 234 are special purpose registers which facilitate reading and writing MPU entries. MAS registers 234 may be read from or written to using processor instructions executed by processor 10 such as a move to special purpose register (mtspr) to write to MAS registers 234 and a move from special purpose register (mfspr) to read from MAS registers 234. To further facilitate reading and writing the region descriptors of MPU 60, MPU configuration register 232 may also be used.

FIG. 9 illustrates, in diagrammatic form, MPU configuration register 232 which includes various fields. In the illustrated embodiment, MPU configuration register 232 stores the architecture version, other capabilities information, as needed, a number of instruction entries, a number of data entries, and a number of shared entries. The number of instruction entries indicates a number of region descriptors in subset 202. The number of data entries indicates a number of region descriptors in subset 204. The number of shared entries indicates a number of region descriptors in subset 206.

Figure 10:
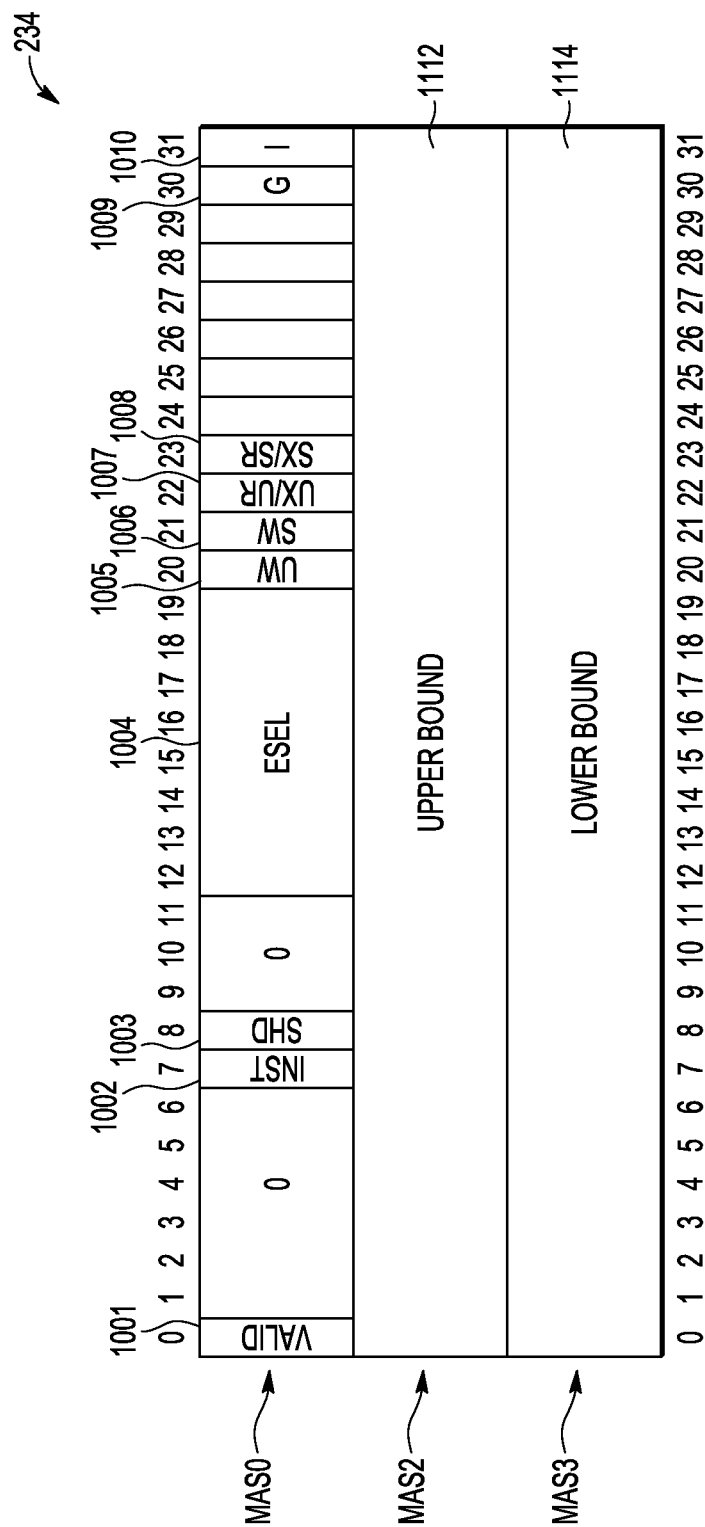
FIG. 10 illustrates, in diagrammatic form, MPU assist registers useable in the MPU of FIG. 2, in accordance with one embodiment of the present invention.

FIG. 10 illustrates, in diagrammatic form, illustrates the various fields of MAS0, MAS2, and MAS3, in accordance with one embodiment. For example, in the illustrated embodiment, MAS0 includes fields 1001-1010, MAS2 includes field 1112, and MAS3 includes field 1114. Field 1001 relates to a valid indicator, field 1002 relates to an instruction entry (INST), field 1003 relates to a shared entry select (SHD), field 1004 relates to an entry select (ESEL), field 1005 relates to a UW permission indicator, field 1006 relates to an SW permission indicator, field 1007 relates to a UX/UR permission indicator, field 1008 relates to an SX/SR permission indicator, field 1009 relates to a cache inhibited (CI) attribute, and field 1010 relates to a guarded (G) attribute.

In order to update a region descriptor of MPU 60, each of the fields of MAS0, MAS2, and MAS3 may be loaded with appropriate information (as will be described further below) by execution of an mtspr instruction. Processor 10 may then execute an MPU write entry (MPUWE) processor instruction to store the appropriate contents of MAS registers 234 to a select region descriptor of MPU 60. Similarly, in order to read a region descriptor of MPU 60, processor 10 may execute an MPU read entry (MPURE) processor instruction to store the contents of a selected region descriptor of MPU 60 into appropriate fields of MAS0, MAS2, and MAS3. Processor 10 may then execute an mfspr instruction to read this information from MAS registers 234. The region descriptor selected for a read or write access is selected by using particular fields within MAS0. For example, as will be described in reference to FIGS. 11 and 12 below, the SHD, INST, and ESEL fields of MAS0 can be used to select an individual region descriptor of MPU 60 on which to perform a read or write operation.

FIGS. 11 and 12 provide, in table form, a description for each of the fields in MPU assist registers 234. Field 1001 relates to the VALID bit which, when negated (e.g. a logic level 0), indicates that the MPU entry being operated on is invalid and when asserted (e.g. a logic level 1), indicates that the MPU entry being operated on is valid. That is, when using MAS register 234 to write to a region descriptor, if the VALID bit of MAS0 is asserted, a logic level one will be written to the VALID bit of the selected region descriptor being updated. If the VALID bit of MAS0 is negated, a logic level zero will be written to the VALID bit of the selected region descriptor.

Field 1002 relates to the INST bit, field 1003 relates to the SHD bit, and field 1004 relates to the ESEL value. These fields are used to select a particular entry within MPU 60 to access (such as with an MPURE instruction or an MPUWE instruction). The INST and SHD bits indicate which of the plurality of subsets of MPU 60 (subset 202, 204, or 206) contains the region descriptor entry to be accessed, and ESEL is used to indicate the particular region descriptor within the subset indicated by the INST and SHD bits that is to be accessed. Individual entries within each of subset 202, 204, and 206 are referred to or indexed by ESEL numbers. The first entry in each subset corresponds to an ESEL of 0, which each subsequent entry within the same subset corresponding to an ESEL of 1, 2, 3, etc. Therefore, each entry of subset 202 is numbered, starting from the first entry, with an ESEL of 0 and continues to N (where N corresponds to the total number of entries within subset 202, as indicated by MPU configuration register 232). Each entry of subset 204 is numbered, starting from the first entry, with an ESEL of 0 and continues to M (where M corresponds to the total number of entries within subset 204, as indicated by MPU configuration register 232). Each entry of subset 206 is numbered, starting from the first entry, with an ESEL of 0 and continues to Y (where Y corresponds to the total number of entries within subset 206, as indicated by MPU configuration register 232). Each of M, N, and Y can be any integer value of zero or greater. In one embodiment, M is 5 (such that subset 202 includes 6 entries), N is 11 (such that subset 204 has 12 entries), and Y is 5 (such that subset 206 includes 6 entries). However, other implementations of MPU 60 may be utilized in which each subset has a different number of entries.

Referring to FIG. 11, when SHD is negated (e.g. a logic level zero), the shared portion (e.g. shared subset 206) of MPU 60 is not accessed on a MPURE or MPUWE operation. Either the instruction portion (instruction subset 202) or the data portion (data subset 204) is accessed based on the setting of INST in field 1002. Referring to the INST bit in FIG. 11, when SHD is negated (a logic level 0), the INST bit is used to select the particular subset (subset 202 or 204) to access. If the INST bit is a 0, data subset 204 is used for MPURE and MPUWE instruction operations, and if the INST bit is a 1, instruction subset 202 is used for MPURE and MPUWE instruction operations. Furthermore, in this case in which SHD is zero, the particular entry within the subset selected by INST is indicated by the ESEL value in field 1004. For example, if ESEL is 3, then the fourth entry of data subset 204 is accessed if INST is 0, or the fourth entry of instruction subset 202 is accessed if INST is 1.

If, however, SHD is asserted (e.g. a logic level one), the shared portion (shared subset 206) is accessed on a MPURE or MPUWE instruction operation. The instruction and data portions (subsets 202 and 204) are not accessed. In this case, the INST bit in field 1002 is used to indicate whether the entry in the shared subset that is to be accessed is to be assigned as an entry for instruction access or data access matching. Furthermore, the particular entry within shared subset 206 that is to be accessed is indicated by the ESEL value in field 1004. For example, upon an MPUWE instruction operation, SHD is 1 and INST is 0, then the entry indicated by ESEL will have its INST field set to a 0 to indicate that it is a data region descriptor which will be used only by data compare logic 226 to determine a match (and the corresponding instruction compare logic 224 for the selected entry will be disabled). If, upon an MPUWE instruction operation, SHD is 1 and INST is 1, then the entry indicated by ESEL will have its INST field set to a 1 to indicate that it is an instruction region descriptor which will be used only by instruction compare logic 224 to determine a match (and the corresponding data compare logic 226 for the selected entry will be disabled).

Field 1005 relates to the UW permission indicator, which, when negated (e.g. a logic level zero), indicates no user mode write permission and when asserted (e.g. a logic level one), indicates user mode has write permission. Note that when INST in field 1004 is zero (indicating that a region descriptor in data subset 204 is being accessed or a region descriptor configured as a data region descriptor in shared subset 206 is being accessed), the value of UW indicates the user mode write permission. In this case, upon an MPUWE operation, the value of UW is stored to the UW field of the region descriptor being accessed. However, if INST in field 1004 is one (indicating that a region descriptor in instruction subset 202 is being accessed or a region descriptor configured as an instruction region descriptor in shared subset 208 is being accessed), the value of UW in field 1005 is ignored. This is because, for instruction region descriptors, the UW field is not needed. For example, it is not included in region descriptor 500.

Field 1006 relates to the SW permission indicator, which, when negated (e.g. a logic level zero), indicates no supervisor mode write permission and when asserted (e.g. a logic level one), indicates supervisor mode has write permission. Note that when INST in field 1004 is zero (indicating that a region descriptor in data subset 204 is being accessed or a region descriptor configured as a data region descriptor in shared subset 206 is being accessed), the value of SW indicates the supervisor user mode write permission. In this case, upon an MPUWE operation, the value of SW is stored to the SW field of the region descriptor being accessed. However, if INST in field 1004 is one (indicating that a region descriptor in instruction subset 202 is being accessed or a region descriptor configured as an instruction region descriptor in shared subset 208 is being accessed), the value of SW in field 1005 is ignored. This is because, for instruction region descriptors, the SW field is not needed. For example, it is not included in region descriptor 500.

Field 1007 relates to the UX/UR permission indicator, which, when negated, indicates no user mode execute/read permission and when asserted (e.g. a logic level one), indicates user mode has execute/read permission. When INST in field 1004 is a one (indicating that a region descriptor in instruction subset 202 is being accessed or a region descriptor configured as an instruction region descriptor in shared subset 208 is being accessed), the value of UX/UR is used to determine the user mode execution permission. In this case, upon an MPUWE operation, the value of UX/UR is stored to the UX field of the instruction region descriptor being accessed (if subset 202 is being accessed) or the UX/UR of the instruction region descriptor being accessed (if subset 206 is being accessed). When INST in field 1004 is a zero (indicating that a region descriptor in data subset 204 is being accessed or a region descriptor configured as a data region descriptor in shared subset 206 is being accessed), the value of UX/UR is used to determine the user mode read permission. In this case, upon an MPUWE operation, the value of UX/UR is stored to the UR field of the data region descriptor being accessed (if subset 204 is being accessed) or the UX/UR of the data region descriptor being accessed (if subset 206 is being accessed).

Field 1008 relates to the SX/SR permission indicator, which, when negated, indicates no supervisor mode execute/read permission and when asserted (e.g. a logic level one), indicates supervisor mode has execute/read permission. When INST in field 1004 is a one (indicating that a region descriptor in instruction subset 202 is being accessed or a region descriptor configured as an instruction region descriptor in shared subset 208 is being accessed), the value of SX/SR is used to determine the supervisor mode execution permission. In this case, upon an MPUWE operation, the value of SX/SR is stored to the SX field of the instruction region descriptor being accessed (if subset 202 is being accessed) or the SX/SR of the instruction region descriptor being accessed (if subset 206 is being accessed). When INST in field 1004 is a zero (indicating that a region descriptor in data subset 204 is being accessed or a region descriptor configured as a data region descriptor in shared subset 206 is being accessed), the value of SX/SR is used to determine the supervisor mode read permission. In this case, upon an MPUWE operation, the value of SX/SR is stored to the SR field of the data region descriptor being accessed (if subset 204 is being accessed) or the SX/SR of the data region descriptor being accessed (if subset 206 is being accessed).

Field 1009 relates to the CI bit which, when not asserted (e.g. a logic level zero), indicates that the region is considered cacheable and when asserted (e.g. a logic level one), indicates that the region is considered cache-inhibited. For example, upon an MPUWE operation, the value of the CI bit is used to update the CI bit of the region descriptor being updated.

Field 1010 relates to the G bit which, when not asserted (e.g. a logic level zero), indicates that accesses to the region are not guarded and can be performed before it is known if they are required by the sequential execution mode, and when asserted (e.g. a logic level one), indicates that the region is considered guarded and that all loads and stores to the region are performed without speculation (i.e. they are known to be required). This bit is not implemented in dedicated instruction entries (i.e. instruction-only region descriptors), and is ignored in shared entries with INST=1.

Field 1112 in MAS2 and field 1114 in MAS3 relate to the upper bound and lower bound of the address region corresponding to a region descriptor. For example, in the case of an MPUWE operation, the value of field 1112 is stored to the UPPERBOUND ADDRESS field of the selected region descriptor being updated and the value of field 1114 is stored to the LOWERBOUND field of the region descriptor being updated. Similarly, in the case of an MPURE operation, the values of the UPPERBOUND ADDRESS and LOWERBOUND ADDRESS of the selected region descriptor being accessed are stored to fields 1112 and 1114, respectively.

Therefore, by now it can be appreciated how an MPU having a dedicated instruction subset (e.g. subset 202), a dedicated data subset (e.g. subset 204), and a shared data subset (e.g. 206) in which each region descriptor can be configured to either be a data region descriptor or instruction region descriptor is capable of increasing flexibility. In this manner, the total number of instruction region descriptors and the total number of data region descriptors can vary from system to system or from application to application. Also, system cost is reduced since a maximal number for each of the instruction region descriptors and data region descriptors is not needed, thus allowing for a reduced total number of entries in the MPU. Furthermore, by assigning the first entry of each subset of region descriptors an ESEL value of 0, accessing MPU entries for reading or writing is simplified. The use of an SHD field, INST field, and ESEL field provides a method for selection of an individual region descriptor to be operated on (i.e. accessed), such as with an MPURE or MPUWE instruction.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a data processing system including a memory protection unit (MPU); and a plurality of region descriptors associated with the MPU, wherein each region descriptor is associated with one of multiple subsets of the region descriptors and include an address range, protection settings, and attributes for a respective region of memory, and the subsets include data-only region descriptors, instruction-only region descriptors, and shared region descriptors, wherein the shared region descriptors are used to access memory regions for data and instruction memory requests. Item 2 includes the data processing system of item 1 and further includes MPU control logic operable to perform memory protection functions for instructions using the instruction-only region descriptors. Item 3 includes the data processing system of item 1 and further includes MPU control logic operable to perform memory protection functions for data using the data-only region descriptors. Item 4 includes the data processing system of item 1 and further includes MPU control logic operable to perform memory protection functions for data and instructions using the shared region descriptors. Item 5 includes the data processing system of item 1 and further includes a MPU configuration register including information regarding the number of data-only region descriptors, instruction-only region descriptors, and shared region descriptors. Item 6 includes the data processing system of item 1 and further includes a MPU assist register including an instruction entry that indicates whether a MPU region descriptor is one of the data-only region descriptors or one of the instruction-only region descriptors. Item 7 includes the data processing system of item 1 and further includes a MPU assist register including a shared entry select that controls use of the shared region descriptors. Item 8 includes the data processing system of item 1 and further includes a MPU assist register including an entry select indicator that is used to select one of the shared region descriptors. Item 9 includes the data processing system of item 1 and further includes control logic operable to number individual entries within each of the subsets of the region descriptors starting at entry zero in each subset.

Item 10 includes a data processing system including a memory protect unit (MPU) having: a set of instruction region descriptors used to specify regions of memory for instructions; first instruction compare logic to control access to memory for the instructions; a set of instruction region descriptors used to access regions of memory for data requests; first data compare logic to control access to memory for the data requests; a set of shared region descriptors used to access regions of memory for instructions and data requests; second instruction compare logic to control access to memory specified by the shared region descriptors; and second data compare logic to control access to memory specified by the shared region descriptors. Item 11 includes the data processing system of item 10 and further includes a MPU configuration register that specifies quantities of the instruction region descriptors, data region descriptors, and shared region descriptors. Item 12 includes the data processing system of item 13 and further includes supervisor execute indicators and user execute indicators included only in the instruction region descriptors and the shared region descriptors. Item 13 includes the data processing system of item 10 and further includes user read/write permission indicators and supervisor read/write permission indicators included only in the data region descriptors (204) and the shared region descriptors. Item 14 includes the data processing system of item 10 and further includes MPU control logic; a MPU assist register including indicators that enable the MPU control logic to determine whether to use one of the instruction region descriptors, one of the data region descriptors, or one of the shared region descriptors for an operation on a region descriptor. Item 15 includes the data processing system of item 10 and further includes MPU control logic; and a MPU assist register including an indicator that enables the MPU control logic to determine whether to use one of the shared region descriptors for an operation on a region descriptor Item 16 includes a method including determining whether a shared indicator is in a first state; if the shared indicator is in the first state, selecting an entry in a set of shared region descriptors in a memory protect unit of a data processing system for access; determining whether the shared indicator in a second state; and if the shared indicator is in the second state, selecting an entry in a set of data region descriptors or a set of instruction region descriptors in the MPU for access. Item 17 includes the method of item 16 and further includes determining quantities of the instruction region descriptors, the data region descriptors, and the shared region descriptors based on information in a MPU configuration register. Item 18 includes the method of item 17 and further includes if the shared indicator is in the second state, determining whether an instruction indicator is in a first instruction state; and if the instruction indicator is in the first instruction state, selecting an entry in the instruction region descriptors for access. Item 19 includes the method of item 18 and further includes if the instruction indicator is not in the first instruction state, selecting an entry in the data region descriptors for access. Item 20 includes the method of item 16 and further includes selecting an entry in the shared region descriptors, instruction region descriptors, or data region descriptors using an entry select indicator in a MPU assist register.

What is claimed is:

1. A data processing system comprising:
    a memory protection unit (MPU);
    a plurality of region descriptors associated with the MPU, wherein each region descriptor is associated with one of multiple subsets of the region descriptors and includes an address range, protection settings, and attributes for a respective region of memory, the subsets including a subset of data-only region descriptors, a subset of instruction-only region descriptors, and a subset of shared region descriptors;
    a first shared region descriptor of the subset of shared region descriptors, the first shared region descriptor including a first indicator to selectively configure the first shared region descriptor to operate as one of a data region descriptor or an instruction region descriptor;
    first instruction compare logic coupled to an instruction address bus and to the first shared region descriptor, the first instruction compare logic to compare an address at the instruction address bus with a first address range specified at the first region descriptor; and
    first data compare logic coupled to a data address bus and to the first shared region descriptor, the first data compare logic to compare an address at the data address bus with the first address range;
    wherein the first instruction compare logic is enabled and the first data compare logic is disabled if the first indicator is in a first state; and
    wherein the first instruction compare logic is disabled and the first data compare logic is enabled if the first indicator is in a second state.

2. The data processing system of claim 1 further comprising:
    MPU control logic operable to perform memory protection functions for instructions using the instruction-only region descriptors.

3. The data processing system of claim 1 further comprising:
    MPU control logic operable to perform memory protection functions for data using the data-only region descriptors.

4. The data processing system of claim 1 further comprising:
    MPU control logic operable to perform memory protection functions for data and instructions using the shared region descriptors.

5. The data processing system of claim 1 further comprising:
    a MPU configuration register including information regarding the number of data-only region descriptors, instruction-only region descriptors, and shared region descriptors.

6. The data processing system of claim 1 further comprising:
    a MPU assist register including an instruction entry that indicates whether a MPU region descriptor is one of the data-only region descriptors or one of the instruction-only region descriptors.

7. The data processing system of claim 1 further comprising:
    a MPU assist register including a shared entry select that controls use of the shared region descriptors.

8. The data processing system of claim 1 further comprising:
    a MPU assist register including an entry select indicator that is used to select one of the shared region descriptors.

9. The data processing system of claim 1 further comprising:
    control logic operable to number individual entries within each of the subsets of the region descriptors starting at entry zero in each subset.

10. A data processing system comprising:
    a memory protect unit (MPU) including:
        a set of instruction region descriptors to selectively allow or deny instruction access requests;
        first instruction compare logic to control access to a memory for the instruction access requests;
        a set of data region descriptors to selectively allow or deny data access requests;
        first data compare logic to control access to the memory for the data access requests;
        a set of shared region descriptors, wherein each shared region descriptor is selectively configurable to operate as one of a data region descriptor or an instruction region descriptor, the set of shared region descriptors including a first shared region descriptor, the first shared region descriptor including a first indicator to selectively configure the first shared region descriptor to operate as one of a data region descriptor or an instruction region descriptor;
        second instruction compare logic coupled to an instruction address bus and to the first shared region descriptor, the first instruction compare logic to compare an address at the instruction address bus with a first address range specified at the first region descriptor; and
        second data compare logic coupled to a data address bus and to the first shared region descriptor, the first data compare logic to compare an address at the data address bus with the first address range;
        wherein the second instruction compare logic is enabled and the second data compare logic is disabled if the first indicator is in a first state; and
        wherein the second instruction compare logic is disabled and the second data compare logic is enabled if the first indicator is in a second state.

11. The data processing system of claim 10 further comprising:
    a MPU configuration register that specifies quantities of the instruction region descriptors, data region descriptors, and shared region descriptors.

12. The data processing system of claim 11 further comprising:
    supervisor execute indicators and user execute indicators included only in the instruction region descriptors and the shared region descriptors.

13. The data processing system of claim 10 further comprising:
    user read/write permission indicators and supervisor read/write permission indicators included only in the data region descriptors and the shared region descriptors.

14. The data processing system of claim 10 further comprising:
    MPU control logic;

a MPU assist register including indicators that enable the MPU control logic to determine whether to use one of the instruction region descriptors, one of the data region descriptors, or one of the shared region descriptors for an operation on a region descriptor.

15. The data processing system of claim 10 further comprising:
    MPU control logic; and
    a MPU assist register including an indicator that enables the MPU control logic to determine whether to use one of the shared region descriptors for an operation on a region descriptor.

16. A method comprising:
    determining whether a shared indicator included at an assist register of a memory protection unit (MPU) is in a first state, the assist register for updating region descriptors of the MPU;
    if the shared indicator is in the first state, selecting an entry in a set of shared region descriptors in the MPU of a data processing system for access, wherein a shared region descriptor is selectively configurable to operate as one of a data region descriptor or an instruction region descriptor based on an indicator included at the region descriptor;
    determining whether the shared indicator is in a second state; and
    if the shared indicator is in the second state, selecting an entry in a set of data region descriptors or a set of instruction region descriptors in the MPU for access, and disabling selection of an entry in the set of shared region descriptors for access.

17. The method of claim 16 further comprising:
    determining quantities of the instruction region descriptors, the data region descriptors, and the shared region descriptors based on information in a MPU configuration register.

18. The method of claim 17 further comprising:
    if the shared indicator is in the second state, determining whether an instruction indicator is in a first instruction state; and
    if the instruction indicator is in the first instruction state, selecting an entry in the instruction region descriptors for access.

19. The method of claim 18 further comprising:
    if the instruction indicator is not in the first instruction state, selecting an entry in the data region descriptors for access.

20. The method of claim 16 further comprising:
    selecting an entry in the shared region descriptors, instruction region descriptors, or data region descriptors using an entry select indicator in the MPU assist register.

* * * * *